(12) United States Patent
Nakajima et al.

(10) Patent No.: US 7,481,861 B2
(45) Date of Patent: Jan. 27, 2009

(54) LIQUID TRAP DEVICE FOR GAS

(75) Inventors: Yohji Nakajima, Miyagi (JP); Hiroaki Yamamoto, Miyagi (JP); Takashi Yoshida, Miyagi (JP); Hiroyuki Goto, Saitama (JP)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 94 days.

(21) Appl. No.: 11/557,724

(22) Filed: Nov. 8, 2006

(65) Prior Publication Data

US 2007/0125050 A1 Jun. 7, 2007

(30) Foreign Application Priority Data

Nov. 9, 2005  (JP)  ............... 2005-325208

(51) Int. Cl.
    *B01D 45/00* (2006.01)
(52) U.S. Cl. ............... 55/410; 55/490; 55/505
(58) Field of Classification Search ............ 55/319, 55/385.3, 417, 418, 420, 498, 410, 490, 505; 123/198 E
    See application file for complete search history.

(56) References Cited

U.S. PATENT DOCUMENTS

| | | | |
|---|---|---|---|
| 2,746,562 A | | 5/1956 | Ryall |
| 4,157,968 A | * | 6/1979 | Kronsbein ............... 210/489 |
| 4,336,043 A | * | 6/1982 | Aonuma et al. ............ 55/483 |
| 4,516,994 A | | 5/1985 | Kocher |
| 4,618,417 A | * | 10/1986 | Yamanouchi et al. ....... 210/149 |
| 4,976,852 A | * | 12/1990 | Janik et al. ................ 210/86 |
| 5,017,285 A | * | 5/1991 | Janik et al. ............... 210/232 |
| 5,084,170 A | * | 1/1992 | Janik et al. ............... 210/232 |
| 5,454,945 A | * | 10/1995 | Spearman ................. 210/315 |
| 5,750,024 A | * | 5/1998 | Spearman ................. 210/315 |
| 5,858,227 A | * | 1/1999 | Stone et al. ............... 210/234 |
| 5,961,678 A | | 10/1999 | Pruette et al. |
| 6,174,438 B1 | * | 1/2001 | Hodgkins et al. .......... 210/315 |
| 6,187,188 B1 | * | 2/2001 | Janik et al. ............... 210/232 |

FOREIGN PATENT DOCUMENTS

| | | |
|---|---|---|
| DE | 84 34 233 U1 | 3/1991 |
| GB | 2 033 247 A | 5/1980 |
| GB | 2 033 247 A | 5/1981 |
| JP | 7-328364 A | 12/1995 |
| WO | 99/30798 A | 6/1999 |
| WO | WO 99/30798 A1 | 6/1999 |

\* cited by examiner

*Primary Examiner*—Robert A Hopkins
*Assistant Examiner*—Sonji Turner
(74) *Attorney, Agent, or Firm*—Arent Fox LLP

(57) ABSTRACT

A liquid trap device for gas includes a trap housing and a liquid filter disposed in the trap housing. The liquid filter includes an upper end wall having an opening communicating with a gas inlet, a lower end wall and a cylindrical filter element providing a connection between the upper end wall and the lower end wall. An inflow guide tube is disposed in the filter element, the inflow guide tube having a uniform path area and extending from the opening to the lower end wall so as to guide gas flowing into the gas inlet into the filter element. A distance between a lower end of the inflow guide tube and the lower end wall is set at 20 mm or less. Thus, the liquid trap device for gas has a high performance for trapping liquid.

7 Claims, 6 Drawing Sheets

| | C1(mm) | C2(mm) | A(mm²) | A/a | DURABLE TIME (min) | AMOUNT OF TRAPPED LIQUID (cc) |
|---|---|---|---|---|---|---|
| (A) | 50 | 0 | 4084 | 36 | 260 | 6 |
| (B) | 20 | 30 | 1633 | 14 | 310 | 7 |
| (C) | 15 | 35 | 1225 | 11 | 880 | 20 |
| (D) | 5 | 45 | 408 | 3.6 | 610 | 14 |

LIQUID TRAP DEVICE FOR GAS

RELATED APPLICATION DATA

The present invention is based upon Japanese priority application No. 2005-325208, which is hereby incorporated in its entirety herein by reference.

BACKGROUND OF THE INVENTION

1. Field of the Invention

The present invention relates to an improvement in a liquid trap device for gas, comprising: a trap housing having a gas inlet and a gas outlet at an upper end; and a liquid filter disposed in the trap housing and provided with a cylindrical filter element whose interior communicates with the gas inlet, the gas outlet being opened in the trap housing but outside the liquid filter so that, when a gas flowing from the gas inlet to the gas outlet passes through the filter element, liquid contained in the gas is trapped by the filter element.

2. Description of the Related Art

An automobile having an engine that uses natural gas as fuel, for example, is equipped with a fuel tank in which compressed natural gas is stored. During the operation of the engine, the high-pressure gaseous fuel introduced out of the fuel tank is decompressed to a predetermined pressure and supplied to the engine. When the natural gas is compressed and stored in the fuel tank, lubricating oil in a compressor used for compressing the natural gas more or less mixes into the fuel to be compressed. Thus, when supplying the gaseous fuel in the fuel tank to the engine, the mixed oil is required to be trapped out of the gaseous fuel. The liquid trap device for gas is used for trapping such mixed liquid out of gas, and is already known as disclosed in Japanese Patent Application Laid-Open No. 7-328364, for example.

In such a conventional type of liquid trap device for gas, an opening provided in an upper end wall of a liquid filter is opened in an upper portion in a filter element, and thus the opening and a gas inlet are comparatively close to each other, leading to a tendency that most of the gas flowing from the opening into the filter element passes through the upper portion of the filter element. As a result, the upper portion of the filter element is brought into a locally saturated state where it is clogged with the trapped liquid, thereby extremely deteriorating a liquid trapping performance in the upper portion of the filter element. Also, when liquid seeps out of the saturated state portion of the filter element, the liquid moves along with the stream of gas that has passed through the filter element, proceeds to the gas outlet, and mixes again into the gas, thereby deteriorating the liquid trapping performance.

SUMMARY OF THE INVENTION

The present invention has been achieved with such circumstances in view, and has on object to provide a liquid trap device for gas having a high liquid trapping performance.

According to a first feature of the present invention, there is provided a liquid trap device for gas, comprising: a trap housing having a gas inlet and a gas outlet at an upper end; and a liquid filter disposed in the trap housing and provided with an upper end wall having an opening communicating with the gas inlet, a lower end wall arranged below the upper end wall, and a cylindrical filter element vertically extending to provide a connection between the upper end wall and the lower end wall, the gas outlet being opened in the trap housing but outside the liquid filter so that, when gas flowing from the gas inlet to the gas outlet passes through the filter element, liquid contained in the gas is trapped by the filter element, wherein an inflow guide tube is disposed in the filter element, the inflow guide tube having a uniform path area and extending from the opening to the lower end wall so as to guide gas flowing into the gas inlet into the filter element; and wherein a distance between a lower end of the inflow guide tube and the lower end wall is set at 20 mm or less.

With the first feature of the present invention, the filter element can be prevented as much as possible from being locally saturated with the trapped liquid, thereby extending the durable time of the filter element, and further the amount of trapped liquid can be increased, thereby contributing to improvement in the liquid trapping performance.

According to a second feature of the present invention, in addition to the first feature, the lower end wall is made of a non-permeable material for allowing the gas injected from the inflow guide tube to rebound from the lower end wall.

With the second feature of the present invention, the gas blown out downward from the inflow guide tube is allowed to rebound from the bottom end wall and is directed upward to accelerate diffusion of the gas, thereby contributing to prevention of local saturation in the filter element.

According to a third feature of the present invention, in addition to the first feature, a projection length of the inflow guide tube into the filter element is set at 30 mm or more.

With the third feature of the present invention, in combination with the arrangement wherein the lower end of the inflow guide tube is spaced away from the bottom end wall by 20 mm or less, the local saturation of the filter element due to the trapped liquid can be more effectively prevented, thereby further extending the durable time of the filter element and further increasing the amount of trapped liquid.

According to a fourth feature of the present invention, there is provided a liquid trap device for gas, comprising: a trap housing having a gas inlet and a gas outlet at an upper end; and a liquid filter disposed in the trap housing and provided with an upper end wall having an opening communicating with the gas inlet, a lower end wall arranged below the upper end wall, and a cylindrical filter element vertically extending to provide a connection between the upper end wall and the lower end wall, the gas outlet being opened in the trap housing but outside the liquid filter so that, when gas flowing from the gas inlet to the gas outlet passes through the filter element, liquid contained in the gas is trapped by the filter element, wherein an inflow guide tube is disposed in the filter element, the inflow guide tube having a uniform path area and extending from the opening to the lower end wall so as to guide gas flowing into the gas inlet into the filter element; and wherein a relation between a path area a of the inflow guide tube and an apparent effective filter area A in an inner peripheral area of the filter element, which is located below the inflow guide tube, is set at $A/a \leq 14$.

With the fourth feature of the present invention, the filter element can be prevented as much as possible from being locally saturated with the trapped liquid, thereby extending the durable time of the filter element, and further the amount of trapped liquid can be increased, thereby contributing to improvement in the liquid trapping performance.

According to a fifth feature of the present invention, there is provided a liquid trap device for gas, comprising: a trap housing having a gas inlet and a gas outlet at an upper end; and a liquid filter disposed in the trap housing and provided with a cylindrical filter element whose interior communicates with the gas inlet, the gas outlet being opened in the trap housing but outside the liquid filter so that, when a gas flowing from the gas inlet to the gas outlet passes through the filter element, liquid contained in the gas is trapped by the filter element, wherein an outflow guide tube projecting into the trap housing is provided in the gas outlet.

With the fifth feature of the present invention, the outflow guide tube provided in the gas outlet and projecting into the trap housing provides a stagnant airflow region around the outflow guide tube. Thus, even if the liquid trapped by the filter element seeps out of the outer peripheral surface of the filter element and moves along with a stream of the gas passing through the filter element to leave the filter element, the liquid moving along with the stream of the gas strongly strikes against and attaches to an inner peripheral wall of the trap housing due to difference in specific gravity compared with the gas, and separates from the gas. Then, the gas flow changes its direction upward and directly proceeds to the outflow guide tube while avoiding the stagnant air flow region. Therefore, the liquid attached to the inner peripheral surface of the trap housing is not pushed up to a ceiling surface of the trap housing. Thus, the liquid is prevented from flowing into the outflow guide tube, and accordingly the separated liquid is prevented from mixing again into the gas, thereby contributing to the improvement in the liquid trapping performance.

According to a sixth feature of the present invention, in addition to the fifth feature, the outflow guide tube is arranged so that its lower end is positioned above the filter element.

With the sixth feature of the present invention, the outflow guide tube is vertically spaced apart from the liquid filter, thereby preventing the trap housing from having a large diameter, while preventing as much as possible the liquid seeping out of the filter element from directly entering the outflow guide tube.

According to a seventh feature of the present invention, in addition to the fifth feature, a plurality of outflow guide tubes are circumferentially provided in the trap housing.

With the seventh feature of the present invention, the plural outflow guide tubes are arranged in the trap housing in the circumferential direction, thereby reducing pressure loss on the side of the gas outlet while reducing the diameter of each of the outflow guide tubes. With this arrangement, a gap in the radial direction between the liquid filter and the trap housing can be reduced, thereby downsizing the trap housing.

The above-mentioned object, other objects, characteristics, and advantages of the present invention will become apparent a preferred embodiment, which will be described in detail below by reference to the attached drawings.

BRIEF DESCRIPTION OF THE DRAWINGS

FIG. 5 is a table showing specifications and results of the trap performance tests on the four types of the liquid trap device for gas.

DESCRIPTION OF THE PREFERRED EMBODIMENT

Figure 1:
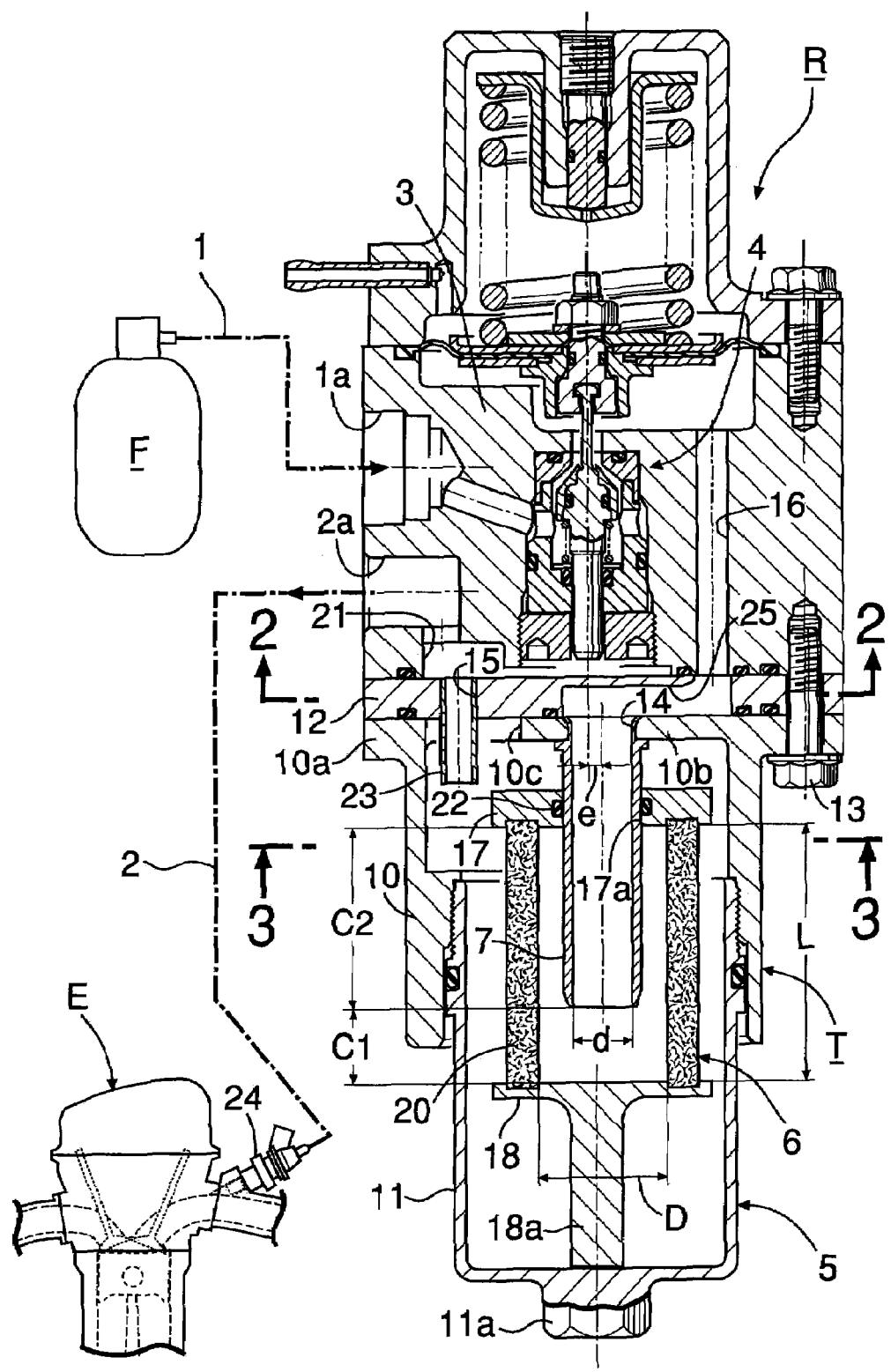
FIG. 1 is a vertical sectional view of a pressure regulator integrally equipped with a liquid trap device for gas according to an embodiment of the present invention.

Referring first to FIG. 1, natural gas as a gaseous fuel is compressed and stored in a fuel tank F. When using the high-pressure gaseous fuel stored in the fuel tank F, the gaseous fuel is supplied through a high-pressure fuel path 1 to a pressure regulator R in order to decompress the pressure of the gaseous fuel to a predetermined value.

The pressure regulator R comprises a rectangular columnar shaped regulator body 3 having on its one side a high-pressure port 1a and a low-pressure port 2a. A downstream end of the high-pressure fuel path 1 is connected to the high-pressure port 1a. An upstream end of a low-pressure fuel path 2 communicating with a fuel injection valve 24 of an engine E is connected to the low-pressure port 2a.

Figure 2:
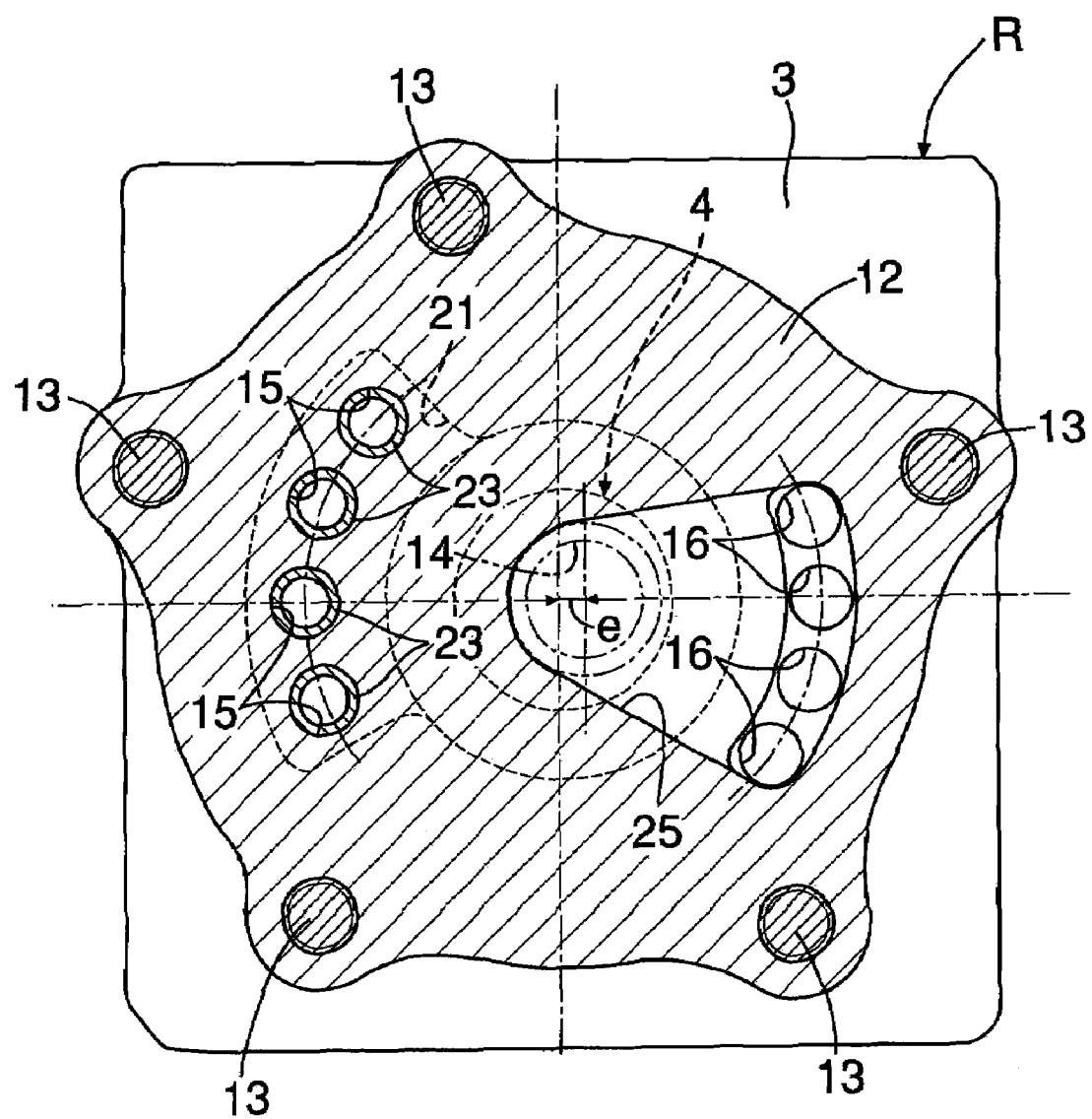
FIG. 2 is a sectional view taken along a 2-2 line of FIG. 1.

As shown in FIGS. 1 and 2, a pressure regulating valve 4 is provided at a central portion of the regulator body 3 in order to decompress a pressure of the gaseous fuel introduced into the high-pressure port 1a to the predetermined value. A plurality of communication paths 16 are provided in the regulator body 3. The communication paths are arranged into an arcuate shape in the circumferential direction of the pressure regulating valve 4, and vertically extend so that the gaseous fuel decompressed by the pressure regulating valve 4 passes on one side of the pressure regulating valve 4.

A liquid trap device T for gas (hereinafter referred to as "trap device T") is attached to a lower end surface of the regulator body 3. This trap device T traps and removes mixed oil out of the gaseous fuel introduced through the communication paths 16, and transfers the resultant clean gaseous fuel to the low-pressure port 2a of the regulator body 3. Next, the trap device T is described in detail below in reference to FIGS. 1 to 3.

The trap device T includes, as main components, a trap housing 5 attached to a lower surface of the regulator body 3 of the pressure regulator R, and an oil filter 6 disposed inside the trap housing 5.

The trap housing 5 comprises: a cylindrical housing body 10 having a mounting flange 10a and a ceiling wall 10b at an upper end; a cup member 11 detachably screwed into a lower end of the housing body 10; and a cover plate 12 superposed on an upper surface of the mounting flange 10a. The cover plate 12 and the mounting flange 10a are fastened through bolts 13 to the lower surface of the regulator body 3 of the pressure regulator R. In this structure, the trap housing 5 and the regulator body 3 are substantially coaxially arranged. A tool engagement portion 11a having a hexagon head bolt shape is integrally formed on a lower surface of the cup member 11 so that the cup member 11 can be attached to and detached from the housing body 10.

The oil filter 6 comprises: an upper end wall 17; a lower end wall 18 arranged below the upper end wall 17; and a cylindrical filter element 20 providing a connection between the upper end wall 17 and the lower end wall 18. The filter element 20 has a function of allowing the gaseous fuel to pass therethrough and trapping liquid such as lubricating oil. An opening 17a is provided at a central portion of the upper end wall 17.

A gas inlet 14 is provided at a central portion of the ceiling wall 10b of the housing body 10. In order to allow the gas inlet 14 to communicate with the plurality of communication paths 16, an inlet path 25 is radially formed in the cover plate 12. The gas inlet 14 is integrally provided with an inflow guide tube 7 which passes through the opening 17a and projects into the filter element 20. A seal member 22 is provided in the upper end wall 17 so as to be in a close contact with an outer peripheral surface of the inflow guide tube 7. In this way, the inflow guide tube 7 is arranged in the filter element 20 so as to extend from the opening 17a to the lower end wall 18. The lower end wall 18 is made of a non-permeable material that allows the gas blown out from the inflow guide tube 7 to rebound from the lower end wall 18.

A columnar support 18a is integrally formed on the lower end wall 18 so as to project from a lower surface thereof and is supported on a bottom portion of the cup member 11. Thus, the entire oil filter 6 is supported by the cup member 11 through the columnar support 18a.

A distance C1 between a lower end of the inflow guide tube 7 and the lower end wall 18 is set at 20 mm or less.

A length C2 by which the inflow guide tube 7 projects into the filter element 20 is set at 30 mm or more.

A ratio between a path area a of the inflow guide tube 7 and an apparent effective area A of the filter element 20, i.e. A/a, is set at 14 or less.

The path area a of the inflow guide tube 7 is determined by the following formula (1):

$$a = \pi d^2 / 4 \quad (1)$$

where d is an inner diameter of the inflow guide tube 7.

The apparent effective area A of the filter element 20 is determined by the following formula (2):

$$A = \pi D \times C1 \quad (2)$$

where D is an inner diameter of the filter element 20, and C1 is a distance between the lower end of the inflow guide tube 7 and the lower end wall 18.

Figure 3:
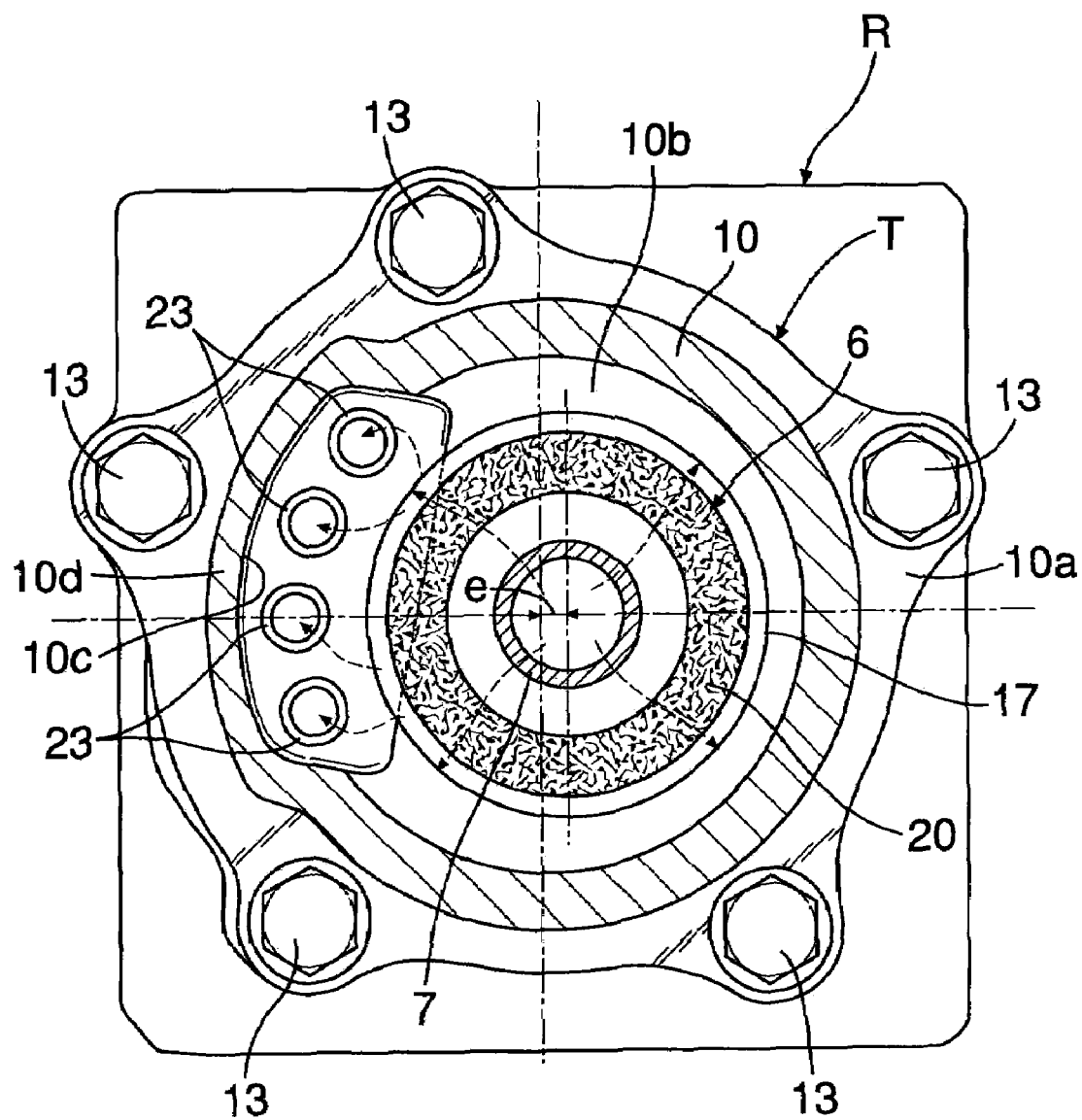
FIG. 3 is a sectional view taken along a 3-3 line of FIG. 1.
Figure 4A:
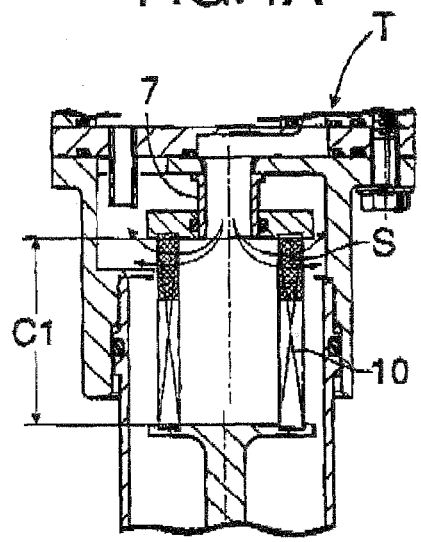
FIGS. 4A to 4D are sectional views showing four types of the liquid trap device for gas, respectively, which are samples for testing trap performance.
Figure 4B:
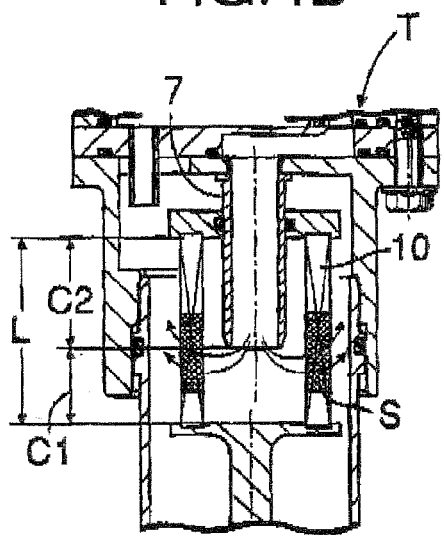
Figure 4C:
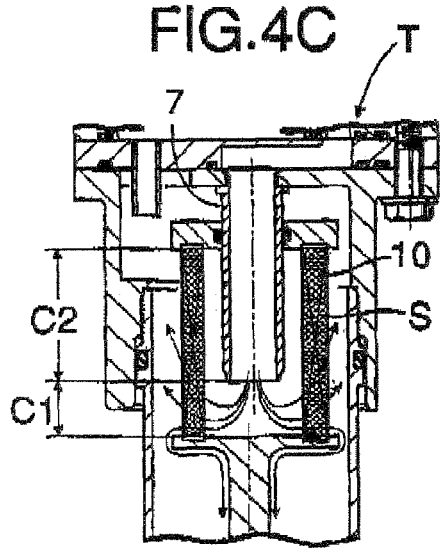
Figure 4D:
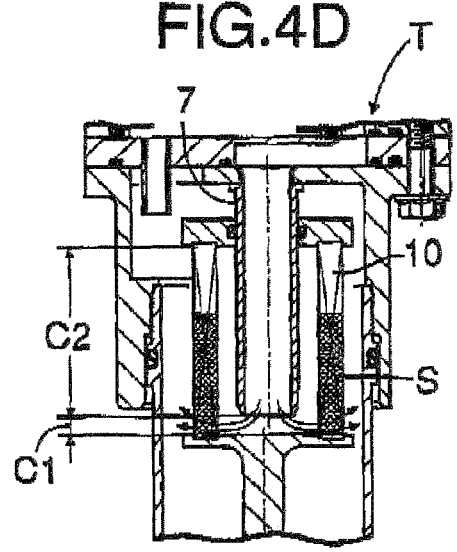
Figure 6:
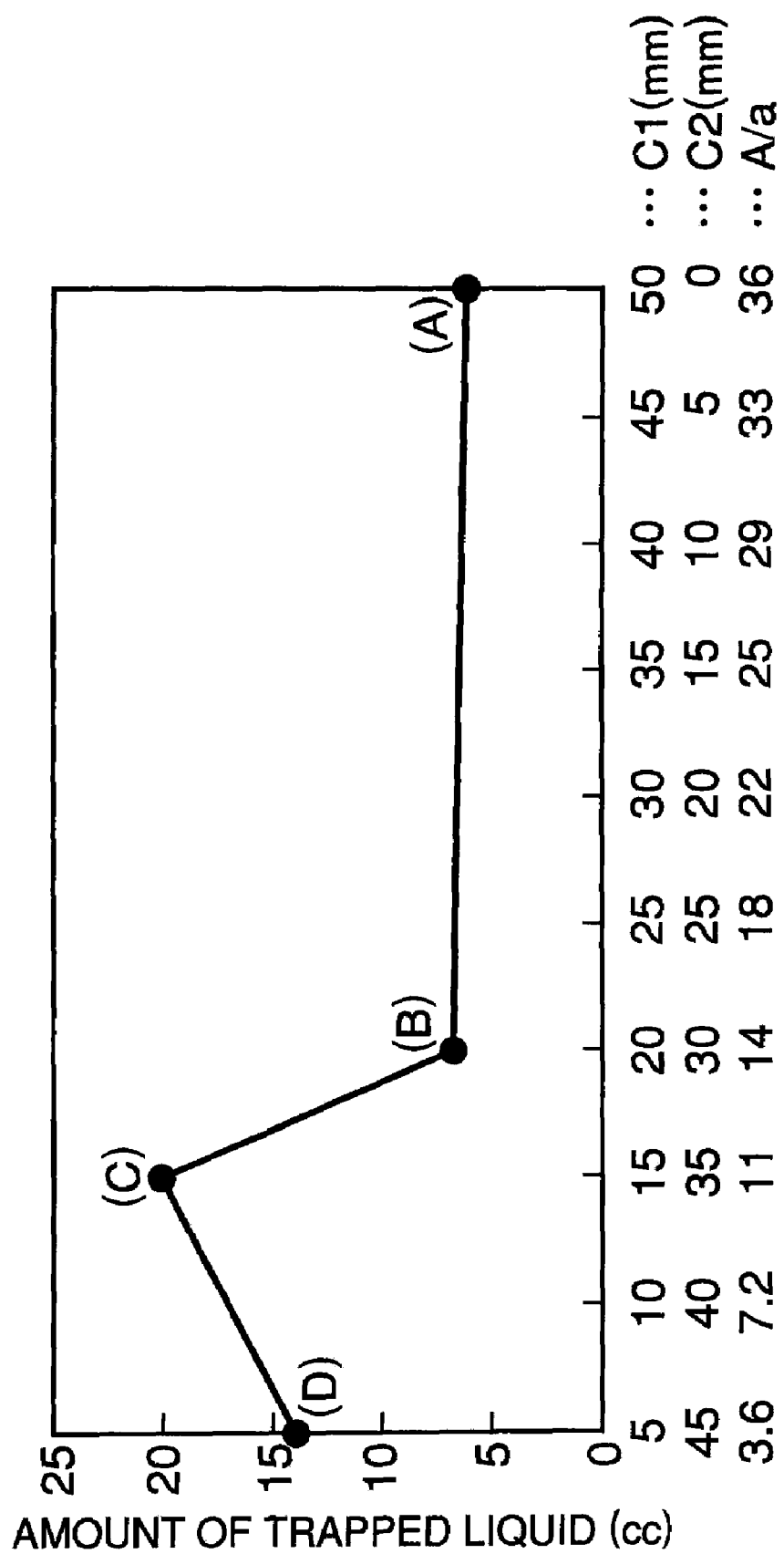
FIG. 6 is a graph showing the results of the trap performance tests on the four types of the liquid trap device for gas.

As shown in FIGS. 1 and 3, a notch 10c is formed in one side of the ceiling wall 10b of the housing body 10. A plurality of gas outlets 15 opening into the housing body 10 but outside the oil filter 6 are formed in the cover plate 12, at a position corresponding to the notch 10c. The plurality of gas outlets 15 are arranged into an arcuate shape in the circumferential direction of the trap housing 5, and communicate with the low-pressure port 2a through a collecting chamber 21 formed in the lower surface of the regulator body 3. A plurality of outflow guide tubes 23 are integrally provided in the plurality of gas outlets 15 so as to project into the housing body 10. That is, also the plurality of outflow guide tubes 23 are arranged into an arcuate shape in the circumferential direction of the trap housing 5. In this structure, all the outflow guide tubes 23 are arranged such that a lower end of each of them is positioned above the filter element 20.

An axis of the oil filter 6 is offset by a small distance e from an axis of the trap housing 5 in a direction opposite from the outflow guide tubes 23. Further, an outer wall 10d of the housing body 10 opposed to the outflow guide tubes 23 is formed so as to bulge in the radial direction. With the above-described arrangement, a sufficient distance can be secured between the oil filter 6 and the outer wall 10d while preventing the trap housing 5 from having a large diameter, whereby the outflow guide tubes 23 having a comparatively large diameter can be disposed between the oil filter 6 and the outer wall 10d while being spaced apart from these members.

The operation of the embodiment is described below.

When the gaseous fuel decompressed to the predetermined pressure by the pressure regulator R reaches the gas inlet 14 of the cover plate 12 of the oil filter 6, the gaseous fuel is introduced into the filter element 20 by the inflow guide tube 7, reaches the lower portion thereof and is diffused. Thus, the gaseous fuel is filtered over a wide range of the filter element 20 where the oil mixed in the gaseous fuel is trapped. In particular, owing to the setting of C1, C2 and A/a, the local saturation of the filter element 20 can be prevented as much as possible, thereby extending the durable time of the filter element 20.

The lower end wall 18 of the oil filter 6 is made of the non-permeable material for allowing the gas that has blown out of the inflow guide tube 7 to rebound from the lower end wall 18. Thus, when the gaseous fuel is blown out downward from the inflow guide tube 7, the gaseous fuel rebounds from the lower end wall 18 and is directed upward, thereby accelerating diffusion of the gaseous fuel to more effectively prevent the local saturation in the filter element 20.

The above-mentioned effects were confirmed by the following tests on the trap performance.

In the tests, as shown in FIGS. 4A to 4D and 5, four types of the trap devices T were prepared as samples (A) to (D) having different values of C1, C2 and A/a. The durable time and the amount of oil trapped by the filter element 20 in each of the samples were measured under the following test conditions.

Temperature of the atmosphere: ambient temperature
Gas: CNG (high-pressure natural gas)
Pressure for introducing gas: 0.25 MPa
Flow rate of gas: 490 L/min
Mixed liquid: lubricating oil
Liquid mixing rate: 15 ppm
Specification common to all the samples: d=12 mm, D=26 mm, a=1 13 mm$^2$ and L=5 0

As shown in FIGS. 4A to 4D and FIGS. 5 and 6, in the sample (A) where C2=0 mm, the gas flowing into the filter element 20 was immediately directed to the gas outlet 15. Thus, a saturation portion S of the filter element 20 caused by the trapped oil concentrates on an upper end portion of the filter element 20 from an early stage. As a result, the durable time of the filter element 20 was short, and accordingly the amount of trapped oil was small.

In the sample (B) where C1=20 mm, the saturation portion S generated at an intermediate portion of the filter element 20 started to increase its range, thereby starting to increase the durable time and the amount of oil trapped by the filter element 20.

In the sample (C) where C1=5 mm, C2=35 mm and A/a=11, the entire filter element 20 gradually turned to the saturation portion S in a long time. The durable time and the amount of oil trapped by the filter element 20 were confirmed to be significantly increased.

In the sample (D) where C1 is made further smaller, the range of the saturation portion S began moving downward, and the durable time and the amount of oil trapped by the filter element 20 started to gradually decrease, but no large decrease was observed.

However, in the case where the apparent effective area A of the filter element 20 is made smaller than the path area a of the inflow guide tube 7, the situation where C1<3 mm and A/a<2.2 should preferably be avoided in the test conditions because these parameters increase the pressure loss of the gas.

As described above, the gas fuel filtered by the filter element 20 passes through the plurality of outflow guide tubes 23 while diverting, and converges into the collecting chamber 21. After that, the gas fuel is injected from the fuel injection valve 24 of the engine E through the low-pressure port 2a and the low-pressure fuel path 2.

There are cases where the oil trapped by the filter element 20 seeps out of the outer peripheral surface of the filter element 20, moves along with the stream of gaseous fuel passing through the filter element 20, and leaves the filter element 20. However, by virtue of the stagnant airflow region formed around the outflow guide tubes 23 provided in the gas outlet 15 and projecting into the trap housing 5, when the gaseous fuel that has passed through the filter element 20 once proceeds radially outward, the oil moving along with the stream of the gaseous fuel strongly strikes against and attaches to the inner peripheral surface of the trap housing 5 due to difference in specific gravity compared with the gas, and separates from the gaseous fuel. After that, the gaseous fuel changes its flow direction upward and directly proceeds to the outflow guide tubes 23, while avoiding the stagnant airflow region. Thus, the oil attached to the inner peripheral surface of the trap housing 5 is not pushed up to the ceiling surface of the trap housing 5, and accordingly the oil never flows into the outflow guide tubes 23.

In this way, the oil that has seeped out of the filter element 20 can be prevented from re-mixing into the gaseous fuel, thereby contributing to the improvement in the oil trapping performance.

Moreover, since the outflow guide tubes 23 are arranged such that each of their lower ends occupies a position above the filter element 20, the outflow guide tubes 23 are vertically spaced apart from the oil filter 6. Thus, the liquid that has seeped out of the filter element 20 can be prevented as much as possible from directly entering the outflow guide tubes 23 while preventing the diameter of the trap housing 5 from becoming large.

Further, since the plural outflow guide tubes 23 are arranged in the trap housing 5 in the circumferential direction, pressure loss on the side of the gas outlet 15 can be reduced while reducing the diameter of each of the outflow guide tubes 23. Thus, the gap in the radial direction between the oil filter 6 and the trap housing 5 can be reduced, thereby downsizing the trap housing 5.

The oil trapped by the filter element 20 and the oil attached to the inner peripheral surface of the trap housing 5 eventually fall down in the form of droplets and are collected in the bottom portion of the cup member 11. By detaching the cup member 11 from the housing body 10, the cup member 11 can be cleaned, and the contaminated oil filter 6 can be replaced by a new one.

The present invention is not limited to the embodiment described above, but various design changes can be made without departing from the subject matter of the present invention.

What is claimed is:

1. A liquid trap device for gas, comprising:
   a trap housing having a gas inlet and a gas outlet at an upper end; and
   a liquid filter disposed in the trap housing and provided with an upper end wall having an opening communicating with the gas inlet, a lower end wall arranged below the upper end wall, and a cylindrical filter element vertically extending to provide a connection between the upper end wall and the lower end wall,
   the gas outlet being opened in the trap housing but outside the liquid filter so that, when gas flowing from the gas inlet to the gas outlet passes through the filter element, liquid contained in the gas is trapped by the filter element,
   wherein an inflow guide tube is disposed in the filter element, the inflow guide tube having a uniform path area and extending from the opening to the lower end wall so as to guide gas flowing into the gas inlet into the filter element; and
   wherein a distance between a lower end of the inflow guide tube and the lower end wall is set at 20 mm or less.

2. The liquid trap device for gas according to claim 1, wherein the lower end wall is made of a non-permeable material for allowing the gas injected from the inflow guide tube to rebound from the lower end wall.

3. The liquid trap device for gas according to claim 1, wherein a projection length of the inflow guide tube into the filter element is set at 30 mm or more.

4. A liquid trap device for gas, comprising:
   a trap housing having a gas inlet and a gas outlet at an upper end; and
   a liquid filter disposed in the trap housing and provided with an upper end wall having an opening communicating with the gas inlet, a lower end wall arranged below the upper end wall, and a cylindrical filter element vertically extending to provide a connection between the upper end wall and the lower end wall,
   the gas outlet being opened in the trap housing but outside the liquid filter so that, when gas flowing from the gas inlet to the gas outlet passes through the filter element, liquid contained in the gas is trapped by the filter element,
   wherein an inflow guide tube is disposed in the filter element, the inflow guide tube having a uniform path area and extending from the opening to the lower end wall so as to guide gas flowing into the gas inlet into the filter element; and
   wherein a relation between a path area a of the inflow guide tube and an apparent effective filter area A in an inner peripheral area of the filter element, which is located below the inflow guide tube, is set at $A/a \leq 14$.

5. A liquid trap device for gas, comprising:
   a trap housing having a gas inlet and a gas outlet at an upper end; and
   a liquid filter disposed in the trap housing and provided with a cylindrical filter element whose interior communicates with the gas inlet,
   the gas outlet being opened in the trap housing but outside the liquid filter so that, when a gas flowing from the gas inlet to the gas outlet passes through the filter element, liquid contained in the gas is trapped by the filter element,
   wherein an outflow guide tube projecting into the trap housing is provided in the gas outlet.

6. The liquid trap device for gas according to claim 5, wherein the outflow guide tube is arranged so that its lower end is positioned above the filter element.

7. The liquid trap device for gas according to claim 5, wherein a plurality of outflow guide tubes are circumferentially provided in the trap housing.

* * * * *